United States Patent [19]
Davidson et al.

[11] Patent Number: 5,589,749
[45] Date of Patent: Dec. 31, 1996

[54] CLOSED LOOP CONTROL SYSTEM AND METHOD USING BACK EMF ESTIMATOR

[75] Inventors: Dale D. Davidson, Glendale; Hamid R. Sadeghpour, Phoenix, both of Ariz.

[73] Assignee: Honeywell Inc., Minneapolis, Minn.

[21] Appl. No.: 298,726

[22] Filed: Aug. 31, 1994

[51] Int. Cl.⁶ ................................................. G05B 9/03
[52] U.S. Cl. .................... 318/564; 318/610; 318/574; 318/565; 244/191
[58] Field of Search ...................... 318/560–646; 388/810–820; 74/471 XY, 424.8, 89.22, 89.2; 244/135 A, 117 A, 194, 191, 177; 364/434, 424, 433

[56] References Cited

U.S. PATENT DOCUMENTS

| | | | |
|---|---|---|---|
| 3,593,092 | 7/1971 | Flippo | 318/564 |
| 3,640,183 | 2/1972 | Koch et al. | 74/424.8 |
| 3,679,956 | 7/1972 | Redmond | 318/564 |
| 3,800,588 | 4/1974 | Larson et al. | 73/71.6 |
| 4,150,803 | 4/1979 | Fernandez | 244/135 A |
| 4,209,734 | 6/1980 | Osder | 318/564 |
| 4,338,555 | 7/1982 | Rhodes . | |
| 4,382,283 | 5/1983 | Clelford et al. | 364/434 |
| 4,594,537 | 6/1986 | Arifian et al. | 318/564 |
| 4,679,103 | 7/1987 | Workman . | |
| 4,697,768 | 10/1987 | Klein | 244/191 |
| 4,764,711 | 8/1988 | Deller | 318/619 |
| 4,797,829 | 1/1989 | Martorella et al. | 318/584 |
| 5,006,775 | 4/1991 | Hamann et al. . | |
| 5,015,934 | 5/1991 | Holley et al. | 318/611 |
| 5,020,125 | 5/1991 | Losic et al. | 388/811 |
| 5,076,517 | 12/1991 | Ferranti et al. | 244/228 |
| 5,155,422 | 10/1992 | Sidman et al. | 318/560 |
| 5,220,259 | 6/1993 | Werner et al. . | |
| 5,264,768 | 11/1993 | Gregory et al. | 318/561 |
| 5,367,237 | 11/1994 | Ring et al. | 318/616 |

*Primary Examiner*—Paul Ip
*Attorney, Agent, or Firm*—Brian C. Downs; Ronald E. Champion

[57] ABSTRACT

A feedback control system which uses estimated back electromotive force(EMF) from a controlled actuator to provide feedback into the control system and improve control of the actuator. Back EMF is estimated from current through the actuator and voltage across the actuator. The estimated back EMF signal is fed back into the control system where it serves as a rate term. In the preferred embodiment the back EMF signal is used in combination with an actuator position signal which is also feedback into the control system. A complementary filter conditions both the rate and position signals for improved performance. The invention is particularly suited for controlling linear actuators which do not provide conventional rate feedback signals.

25 Claims, 2 Drawing Sheets

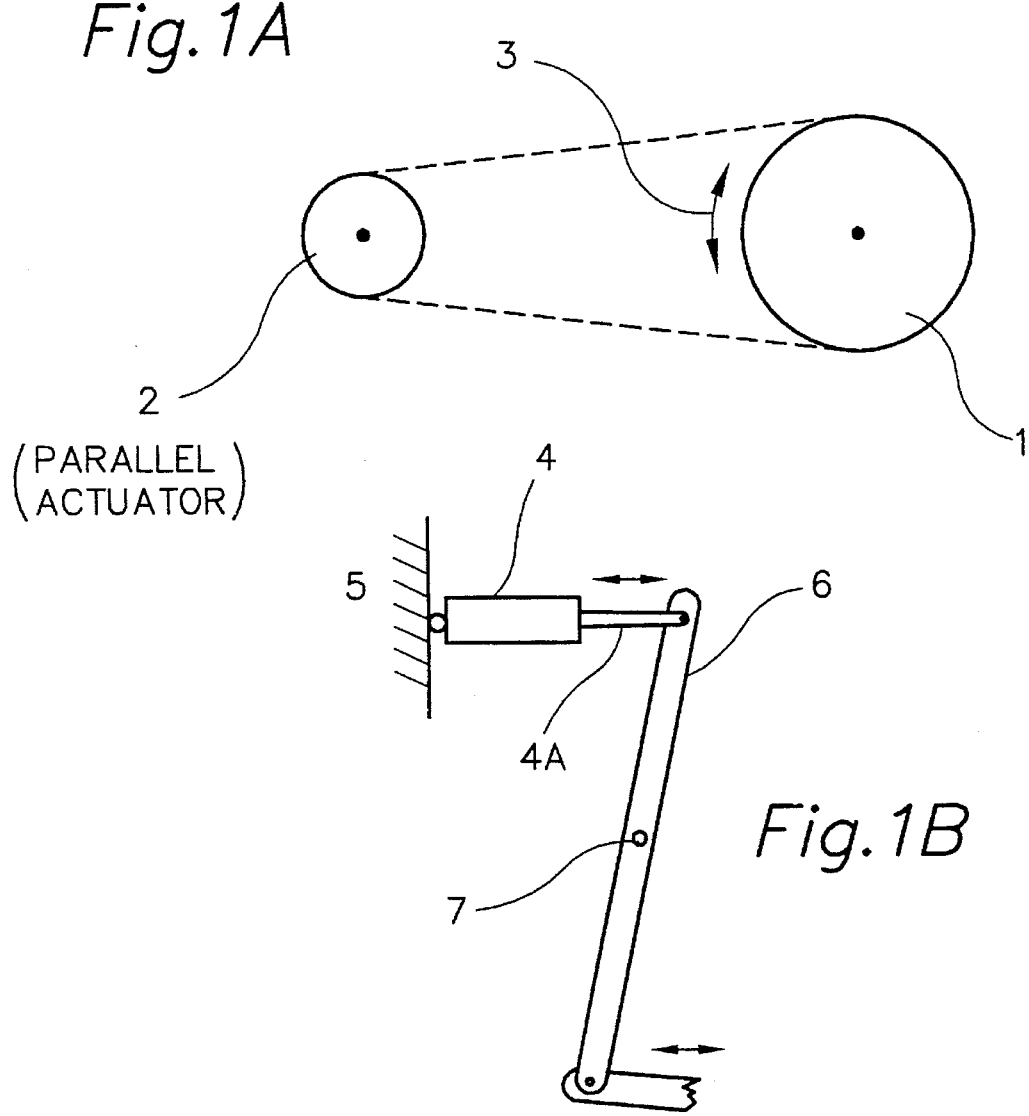
Fig.1A
Fig.1B
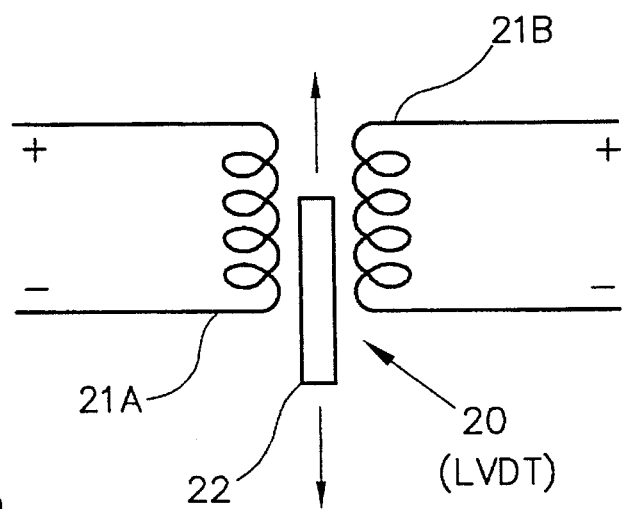
Fig.2

CLOSED LOOP CONTROL SYSTEM AND METHOD USING BACK EMF ESTIMATOR

BACKGROUND OF INVENTION

The present invention relates generally to control systems and more specifically to feedback control systems using estimated back electromotive force(back EMF) as a feedback in the control loop.

Control systems are well known in the art and have been used for many years to control applications ranging from large chemical plants and manufacturing plants to aircraft, automobiles, and home appliances. Early control systems were implemented using analog circuits, however, with the advent of computers and microprocessors, many control systems are now implemented using digital circuits.

One type of control system is a feedback or closed loop control system. A feedback control system controls an output quantity by feeding back a measured value of the controlled quantity and using it to manipulate an input quantity(or command) so as to bring the value of the controlled quantity closer to a desired value.

Control systems are often used to control actuators which in turn perform a desired mechanical operation. Two types of actuators are parallel actuators and linear(or series) actuators. Parallel actuators generally drive a load along a pair of connection points while linear actuators generally drive a load along a single path or connection point. FIGS. 1A and 1B illustrate the difference between parallel and linear actuators.

FIG. 1A shows a load 1 driven by a parallel actuator 2. The dotted lines represent connection means such as chains, cables, belts, or the like connecting the parallel actuator 2 and load 1. Rotation of parallel actuator 2 induces rotation in load 1 as indicated by arrow 3. Those skilled in the art understand that there exist numerous types of parallel actuators.

FIG. 1B shows a linear actuator 4 anchored to a surface 5 and having an extendible arm 4A rotatably attached to a lever 6. Arm 4A extends and retracts causing lever 6 to rotate about pivot point 7. Those skilled in the art understand that there exist numerous types of linear actuators.

This brief description of parallel and linear actuators is for descriptive purposes only and is not intended to limit the scope of the invention.

Parallel and linear actuators are significantly different for control purposes since linear actuators often lack a rate feedback signal suitable for use by a digital feedback control system. Feedback of both rate and position information is essential for precision control of a high gain actuator. Parallel actuators easily provide rate and position feed back based on tachometer signals or the like. Most linear actuators do not provide a rate signal and therefore rate information must be extracted from the position signal which is often generated by a linear variable differential transformer(LVDT). This is costly and unsatisfactory for digital implementations.

FIG. 2 illustrates an LVDT position sensor. A known AC voltage is applied to primary winding 21A which induces AC voltage in secondary winding 21B. Core 22 moves relative to windings 21 indicative of the position of the actuator. Since the position of core 22 affects the electromagnetic coupling between the primary winding 21A and the secondary winding 21B in a known manner, the position of core 22, and thus the position of the actuator can be calculated by measuring the AC voltage in secondary winding 21B.

The prior art uses LVDT position sensors to provide both position and rate feedback data to an analog feedback control circuit. The analog circuit extracts rate information from the LVDT position signal. Although analog feedback circuits function properly they are undesirable since they require many components, cannot be easily adapted to different applications, and are difficult to monitor and test.

Attempts to create a digital equivalent of these analog circuits have been frustrated by difficulties in extracting a digital rate signal from the LVDT position signal. Digital equivalents of the analog design result in a noisy rate signal which is virtually useless. Improving this signal is costly since acceptable performance requires higher processing speed, higher resolution analog to digital(A/D) conversion, more filtering hardware, and more excitation stability for data sampling.

A digital feedback control loop for linear actuators would provide the many advantages discussed above. Clearly there exists a need for a digital feedback control system and method for controlling linear actuators which can be implemented at a reasonable cost.

SUMMARY OF THE INVENTION

The invention creates a feedback control system which uses estimated back electromotive force(EMF) from a controlled actuator to provide feedback into the control system and improve control of the actuator.

Back EMF is estimated from measured current through the actuator and measured voltage across the actuator. Appropriately selected filtering of these measured signals preserves the bandwidth of the estimated back EMF, while also removing noise which would make the digitized signals unusable. The estimated back EMF signal is fed back into the control system where it serves as a rate term. In the preferred embodiment, the back EMF signal is used in combination with an actuator position signal to provide IS feedback to the control system. A complementary filter further conditions both the rate and position signals for improved performance of the control system. The invention is particularly suited for controlling linear actuators which do not provide conventional rate feedback signals.

The invention estimates back EMF generated during electric motor rotation to create a rate signal which is used as feedback to the control loop. The invention makes digital feedback control of linear actuators feasible without the expense of higher processing speeds, higher resolution A/D conversion, more filtering hardware, and more excitation stability for data sampling.

Back EMF is based on the fact that as the rotational speed of an electric motor increases, the voltage drop across the electric motor increases due to electromotive force. For example, electric power applied to an idle motor results initially in high current flow. This satisfies Ohm's Law, $V=I*R$, since current times the motor impedance must be equal to the applied voltage. Similarly, as the motor rotation increases the current decreases. Ohm's Law is satisfied here by the equation: $Vm=I*R+V_2$, where Vm is the voltage applied across the motor and $V_2$ is voltage due to back electromotive force(i.e. back EMF).

The equation is solvable for $V_2$ since R is known and Vm and I can be easily measured. Back EMF is computed by:

$V_2=Vm-I*R$. Rate, being proportional to $V_2$, is then easily computed by multiplying by an appropriate constant.

The rate signal generated from back EMF is useful as feedback in a control loop. It provides lead compensation for both rate and position control of the actuator.

In the preferred embodiment, position information from an LVDT is also fed back into the control loop and a single complementary filter conditions both the rate signal and the position signal. An advantage of the complementary filter is that it minimizes the effects of motor impedance variations due to temperature, eliminating the need for elaborate temperature compensation designs.

The preferred embodiment also includes several filters, gains, and A/D and D/A converters for conditioning, converting, and manipulating the feedback and control signals.

The principal object of the invention is to provide a digital feedback control system using estimated back EMF. The significant features of the invention are illustrated in the figures and described more fully below.

BRIEF DESCRIPTION OF THE DRAWINGS

FIGS. 1A and 1B illustrate parallel and linear actuators.

FIG. 2 illustrates a linear variable difference transformer(LVDT).

DETAILED DESCRIPTION

Figure 3:
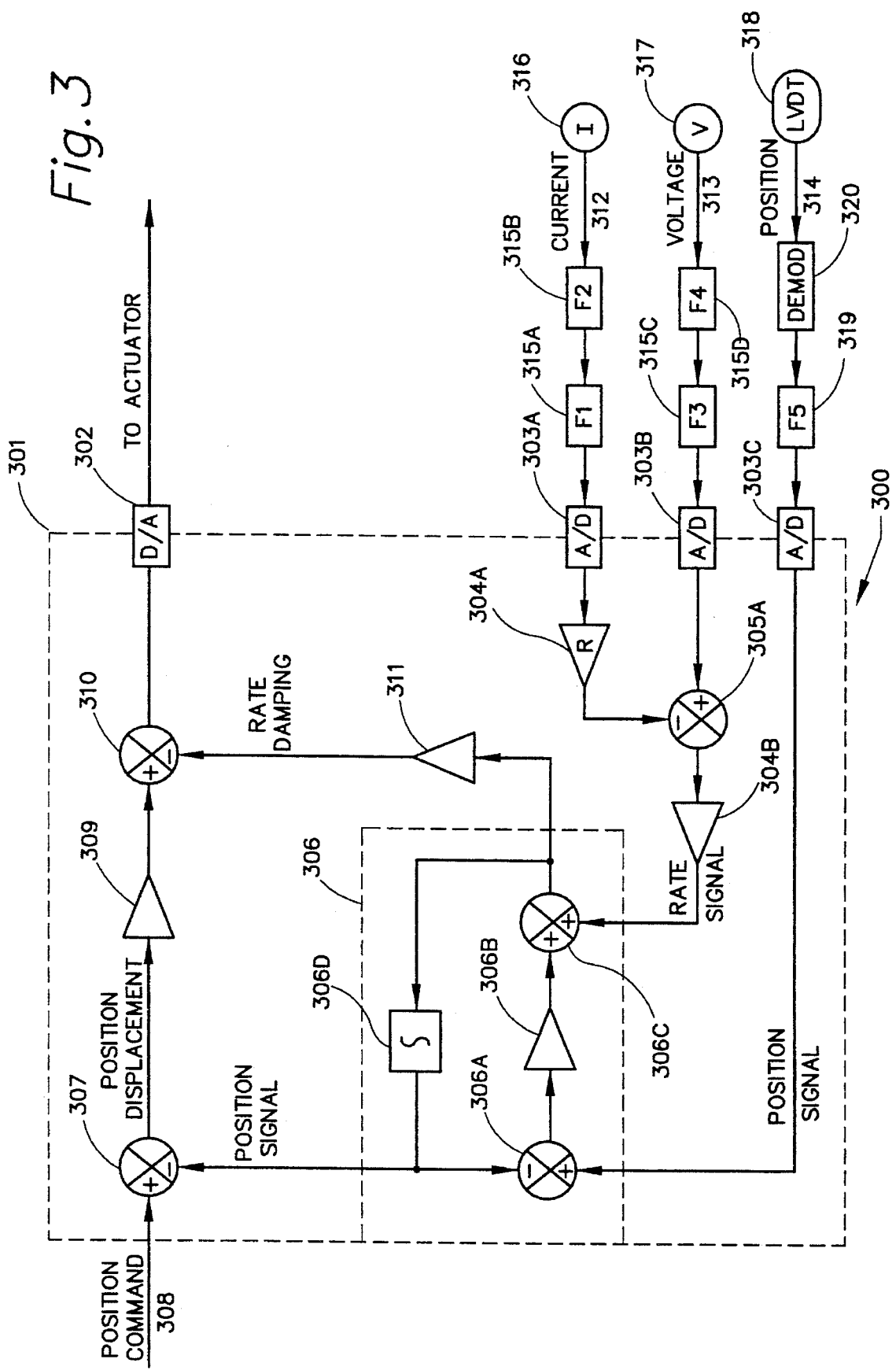
FIG. 3 illustrates the preferred embodiment of the invention.

FIG. 3 illustrates a preferred embodiment of the invention. The embodiment described below is designed specifically for controlling the yaw damper of an aircraft, however, those skilled in the art recognize the invention is useful in many other applications.

FIG. 3 shows control system 300 which receives position commands 308, motor current 312, motor voltage 313, and position data 314. The control system processes these inputs and generates an actuator command.

The preferred embodiment is implemented primarily using digital circuits. The digital portion of the system is denoted by dotted line 301.

Motor current 312, motor voltage 313, and position data 314 are generated by ammeter 316, voltmeter 317, and position sensor 318. Ammeter 316 measures the electric current through the actuator, voltmeter 317 measures the voltage across the actuator, and position sensor 318 measures the position of the actuator.

Filters 315 are analog low pass filters for filtering motor current 312 and motor voltage 313. Filters 315 are specifically selected to block very high levels of 480 Hz noise due to the 480 Hz pulse-width drive amplifier which drives the motor. The preferred embodiment uses filters having a filtering characteristic of $1/(0.0025s+1)$ which attenuate the 480 Hz noise without introducing excessive delay. Two filters 315 are connected in series forming a dual pole filter to attenuate the 480 Hz noise.

Position filter 319 is an analog low pass filter for filtering the position data 314 after it is demodulated by demodulator 320. The position 314 is preferably from an LVDT position sensor 318 operated using an excitation signal operating at 1950 Hz. An excitation signal of 1950 Hz reduces the effect of interference since normally there are no other signals operating near the same frequency. The demodulator 320 compensates for excitation voltage variation and converts the position data to a DC signal suitable for conversion by A/D converter channel 303C. The preferred embodiment uses a filter having a filtering characteristic of $1/(0.05s+1)$.

Analog to digital(A/D) converter channels 303A, B, and C, convert the analog signals into digital signals. A/D converter channel 303A converts motor current, A/D Converter 303B converts motor voltage, and A/D converter channel 303C converts position data into a digital signal. A/D converter channels 303A, 303B, and 303C are shown as separate devices to aide in describing the invention. In the preferred embodiment all three signals (motor current 312, motor voltage 313, and position data 314) are multiplexed into a single A/D converter.

Motor current and motor voltage are combined to create a back EMF term which is used as a rate signal in the control loop. Motor current from A/D converter channel 303A is converted by gain 304A to yield a signal indicative of current(I) times motor impedance(R). The preferred embodiment uses a gain 304A representative of 23.4 ohms.

Back EMF combiner 305A computes the difference between the IR signal from gain 304A and the voltage signal from A/D converter channel 303B.

The difference signal from back EMF combiner 305A is converted by gain 304B into a rate signal. The preferred embodiment uses a conversion value of 0.068 in/sec/volt.

Filter 306 conditions both the rate signal and the position signal. Filter 306 is preferably a complementary filter comprising a first combiner 306A, a delay 306B, a second combiner 306C, and an integrator 306D. First combiner 306A computes the difference between the position signal from A/D converter channel 303C and feedback from integrator 306D. The difference is transmitted through delay 306B which implements a filter time constant of 0.05 second which compensates for delays in the rate signal.

Second combiner 306C sums the position difference from delay 306B with the rate signal from gain 304B. The output of second combiner 306C is fed back into integrator 306D which integrates the signal. The preferred embodiment uses an integration function of $1/s$.

The output of integrator 306D is a conditioned position signal which is one output of complimentary filter 306. The conditioned position signal is also fed back into the complementary filter via first combiner 306A.

The output of second combiner 306C is a conditioned rate feedback signal which is a second output of complimentary filter 306.

Those skilled in the art understand that numerous other filter designs may be used without departing from the spirit of the invention. It should be noted, however, that the complementary filter 306 minimizes the temperature effect (i.e. motor impedance variation) on the back EMF computation thus eliminating the need for additional temperature compensation hardware and software.

Position command combiner 307 computes the difference between position command 308 and the conditioned position signal from complimentary filter 306. This difference is output as a position displacement to displacement gain 309.

Displacement gain 309 converts the position displacement signal to a rate command before it is combined with the rate damping signal by displacement combiner 310. The preferred embodiment uses a displacement gain of 3100%/in.

Damping gain 311 converts the conditioned rate feedback signal from complimentary filter 306 to a rate 10 damping signal. The preferred embodiment uses a damping gain of 62.5%/in/sec.

Displacement combiner 310 computes the difference between the rate command from displacement gain 309 and the rate damping signal from damping gain 311. The difference is output as the motor command. A/D converter 302 converts the motor command to an analog pulse width command which controls the drive amplifier.

In the preferred embodiment the actuator command is converted to a 28 volt pulse width drive signal operating at 480 Hz where the duration of the pulse indicates the magnitude of the command.

The method of implementing the invention is similar to the above description of the system. The method begins with providing measured current, voltage, and position S signals representative of current through the actuator, voltage across the actuator, and the position of the actuator respectively. The current and voltage signals are combined to create a rate signal estimate representative of the rate of movement of the actuator. A complementary filter conditions both the rate and position estimates.

The conditioned position estimate is then combined with a position command to form a position displacement signal which is combined with the conditioned rate estimate to create a rate difference signal. The rate difference signal is then converted to an appropriate analog (or digital) signal for driving the target actuator.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and would therefore be equivalent to the invention. Alternate embodiments envisioned include, but are not limited to, using various digital filters, analog filters, gains, and the like. It is also envisioned that the invention will be implemented using analog circuits, digital circuits, computing devices, and/or software to control a wide variety of controllable devices.

It is clear from the foregoing that the present invention represents a new and useful system and method for controlling actuators and the like using estimated back EMF.

We claim:

1. A feedback control system for controlling an actuator in response to a command signal, said control system comprising:
    a) a first input for receiving said command signal;
    b) a second input for receiving a current signal indicative of the current through said actuator;
    c) a third input for receiving a voltage signal indicative of the voltage across said actuator;
    d) a fourth input for receiving a position signal indicative of the position of said actuator;
    e) a back EMF combiner having,
        1) a first input in communication with said current signal,
        2) a second input in communication with said voltage signal, and,
        3) an output communicating a rate signal indicative of the rate of movement of said actuator;
    f) a position command combiner having,
        1) a first input in communication with said command signal,
        2) a second input in communication with said position signal, and,
        3) an output communicating a position displacement signal indicative of the difference between the signals received by said first input and said second input;
    g) a displacement combiner having,
        1) a first input in communication with said displacement signal,
        2) a second input in communication with said rate signal, and,
        3) an output communicating a rate error signal indicative of the difference between the signals received by said first input and said second input; and,
    h) a filter, interposed between said back EMF combiner and said second input of said displacement combiner, said filter conditioning said rate signal so as to minimize the effect of motor impedance variations.

2. The feedback control system according to claim 1 wherein said filter is a complimentary type filter.

3. The feedback control system according to claim 2 wherein said filter includes an input for receiving said position signal.

4. The feedback control system according to claim 3 wherein said complementary filter includes an output communicating a conditioned position signal to said position command combiner.

5. The feedback control system according to claim 4 further comprising an LVDT which generates said position signal.

6. The feedback control system according to claim 5 wherein said actuator is a linear actuator.

7. The feedback control system according to claim 6 wherein said actuator controls a control surface of an aircraft.

8. The feedback control system according to claim 7 wherein said actuator controls the yaw damper of an aircraft.

9. A closed loop digital control system controlling an actuator having an electrical motor, said control system receiving a position command representative of a desired actuator position and generating an actuator command in response thereof, said control system comprising:
    a) current feedback means for generating a digital current signal representative of the electric current through said actuator;
    b) voltage feedback means for generating a digital voltage signal representative of the voltage across said actuator;
    c) back EMF combining means, in communication with said current signal and said voltage signal, for generating a rate signal representative of the rate of movement of said actuator;
    d) displacement combining means, in communication with said position command and said rate signal, for generating a rate error signal; and,
    e) filter means, interposed between said back EMF combining means and said displacement combining means, for conditioning said rate signal such that motor impedance variation of said electric motor is minimized.

10. The closed loop digital control system according to claim 9 further comprising,
    a) position means for generating a position signal indicative of the position of said actuator; and,
    b) position command combining means, having a first input in communication with said position command and a second input in communication with said position signal, for generating a displacement signal indicative of the difference between said position command and said position signal.

11. The closed loop digital control system according to claim 10 wherein said filter means is a complimentary type filter having a second input in communication with said position signal.

12. The closed loop digital control system according to claim 11 wherein said filter means has a conditioned position signal output and wherein said conditioned position signal output is in communication with said position command combining means.

13. The closed loop digital control system according to claim 12 wherein said current feedback means includes a first dual pole filter.

14. The closed loop digital control system according to claim 13 wherein said position means includes a linear variable differential transformer.

15. The closed loop digital control system according to claim 14 wherein said closed loop control system controls at least one control surface of an aircraft.

16. The closed loop digital control system according to claim 15 wherein said control system controls a yaw damper of an aircraft.

17. The closed loop digital control system according to claim 13 wherein said voltage feedback means includes a second dual pole filter.

18. The closed loop digital control system according to claim 13 wherein said position means includes a demodulator coupled to a low pass filter for condition said position signal prior conversion to a digital signal.

19. A closed loop control method for controlling an actuator using estimated back electromotive force comprising the steps of:

a) providing a current signal indicative of electrical current through said actuator;

b) providing a voltage signal indicative of voltage across said actuator;

c) combining said current signal and said voltage signal to form a rate signal indicative of the rate of movement of said actuator;

d) conditioning said rate signal to diminish the effect of motor impedance variation; and, e) feeding said rate signal back into said control system.

20. The closed loop control method according to claim 19 wherein the step of combining said current signal includes the step of multiplying said current signal by a value representative of the impedance of said actuator.

21. The closed loop control method according to claim 20 wherein the step of feeding said rate signal back into said control system includes the step of combining said rate signal with a displacement signal to generate a rate error signal.

22. The closed loop control method according to claim 21 further comprising the steps of:

a) providing a position signal indicative of the position of said actuator; and, b) combining said position signal with a position command signal to generate said displacement signal.

23. The closed loop control method according to claim 19 wherein the step of conditioning said rate signal uses a complementary filter which has a second input for said position signal.

24. The closed loop control method according to claim 23 wherein the step of filtering uses a complementary filter having a second input in communication with said rate signal.

25. The closed loop control method according to claim 24 wherein said actuator is a linear actuator.

* * * * *